United States Patent [19]

Doughty

[11] Patent Number: 4,840,388
[45] Date of Patent: Jun. 20, 1989

[54] GROCERY CART

[76] Inventor: Robert E. Doughty, 940 South 134th, Bonner Springs, Kans. 66012

[21] Appl. No.: 126,187

[22] Filed: Nov. 27, 1987

[51] Int. Cl.[4] .............................................. B62B 5/04
[52] U.S. Cl. ................................ 280/33.994; 188/19; 188/29
[58] Field of Search ................ 280/33.99 C; 188/2 D, 188/29, 19

[56] References Cited

U.S. PATENT DOCUMENTS

| | | | |
|---|---|---|---|
| 2,958,537 | 11/1960 | Young | 280/33.99 C |
| 3,061,049 | 10/1962 | Bramley | 280/33.99 C |
| 3,095,211 | 6/1963 | Altherr | 280/33.99 C |
| 3,112,121 | 11/1963 | Hummer | 280/33.99 C |
| 3,117,653 | 1/1964 | Altherr | 280/33.99 C |
| 3,376,954 | 4/1968 | Neptune | 188/29 |
| 3,458,015 | 7/1969 | Collins et al. | 280/33.99 C |
| 3,500,965 | 3/1970 | Nossokoff et al. | 188/29 |
| 3,501,164 | 3/1970 | Peterson | 280/33.99 C |
| 3,590,962 | 7/1971 | Parker | 280/33.99 C |
| 3,651,894 | 3/1972 | Auriemma | 280/33.99 C |
| 3,717,225 | 2/1973 | Rashbaum et al. | 188/29 |
| 3,763,966 | 10/1973 | Close | 280/33.99 C |
| 4,018,449 | 4/1977 | Anderson | 280/33.99 C |
| 4,084,663 | 4/1978 | Haley | 280/33.99 C |
| 4,545,591 | 10/1985 | Balha | 280/33.99 C |
| 4,589,525 | 5/1986 | Phipps et al. | 188/2 F |

FOREIGN PATENT DOCUMENTS

| | | |
|---|---|---|
| 3045302 | 7/1982 | Fed. Rep. of Germany ... 280/33.99 C |
| 3336678 | 4/1985 | Fed. Rep. of Germany ... 280/33.99 C |

*Primary Examiner*—David M. Mitchell
*Attorney, Agent, or Firm*—Hovey, Williams, Timmons & Collins

[57] ABSTRACT

An automatic braking apparatus for inclusion with a user-propelled grocery cart, luggage cart or the like is provided which automatically brakes at least one of the cart wheels when not in use and which allows easy, convenient, and automatic release of the braking mechanism by the user during operation. The preferred apparatus includes a braking mechanism shiftable between a braked position for braking at least one cart wheel and a released position for releasing the wheel and including a spring for biasing the mechanism toward the braked position, an intermediate structure pivotally coupled adjacent the cart handle and interconnected with the brake mechanism; and an operating member pivotally coupled with the handle and intercoupled with the intermediate structure including a handle portion for grasping by the cart user. In operation, the user grasps the handle portion and pushes generally forwardly which rotates the operative member, the intermediate structure, and the braking mechanism to the released position; the spring automatically shifts the apparatus components to the braked position when the handle portion is released.

11 Claims, 2 Drawing Sheets

1

GROCERY CART

BACKGROUND OF THE INVENTION

1. Field of the Invention

This invention relates to an automatic braking apparatus for inclusion with a user-propelled grocery cart, luggage cart or the like which allows for automatic release of the braking mechanism when operated by a user and which automatically brakes at least one of the wheels of the cart when released by the user. More particularly, the invention hereof relates to an operating member which fits over the transverse, rearwardly spaced handle of the cart which, when grasped and pushed forwardly by the user, shifts an intermediate structure which in turn, by means of an interconnecting strap, shifts the braking mechanism to the released position.

2. Description of the Prior Art

Grocery carts, luggage carts, or the like in common usage are typically not provided with any type of braking mechanism. This presents a hazard in that such carts, especially when loaded with groceries, luggage, and so forth may become self-propelled on non-level surfaces in parking lots and loading ramps, for example.

When this occurs, the cart can present a substantial hazard to pedestrians and parked cars in the area. A special hazard is presented in such circumstances to a child occupying a child seat commonly provided on such carts.

Even an attentive user of such a cart must typically release hold of the cart while opening the trunk of a car, for example, in order to unload the contents of the cart. Even if the parking lot or loading ramp presents a very gentle slope, the cart may still have a tendency to drift away thereby causing inconvenience and irritation to the user.

The prior art discloses various devices for providing automatic braking and release of user-propelled carts, all with the intent of preventing self-propulsion of the carts on unlevel surfaces. The failure of manufactures to include such prior art braking devices highlights the existence of practical difficulties with such devices. That is to say, such devices either tend to be mechanically complex, unreliable in heavy usage situations, or inconvenient in use.

SUMMARY OF THE INVENTION

The problems outlined above are solved by the automatic braking apparatus of the present invention. That is to say, the apparatus hereof provides for a mechanically simple, reliable, and convenient means for automatically braking a cart when not in use and for automatically releasing the brake during use.

The preferred apparatus includes a braking mechanism for shiftably coupling with a cart adjacent one of the rear wheels thereof, an intermediate structure for shiftably coupling with the cart adjacent the handle thereof, and means biasing the braking mechanism, intermediate structure, and operating member toward a braked position. The intermediate structure includes means for interconnecting with the braking mechanism. The operating member includes means for intercoupling with the intermediate structure for corresponding shifting between the braked and released positions. The operating member also includes a graspable handle portion interposed between the user of the cart and the cart handle for grasping by the user for shifting the operating member and thereby the intermediate structure and braking mechanism from the braked position to the released position when the user grasps the graspable portion and pushes generally forwardly. The biasing means shifts the apparatus to the braked position whenever the user releases the handle portion.

Preferably, the means interconnecting the intermediate structure and the braking mechanism includes a length-adjustable, strap presenting a outwardly exposed reflective surface. Advantageously, the braking mechanism includes braking structure for braking each of the two rear wheels of the cart and corresponding interconnecting straps disposed on either side of the body of the cart for interconnecting respective pivot arms included as part of the intermediate structure.

Other preferred aspects of the present invention will become clear from the detailed description hereinbelow.

BRIEF DESCRIPTION OF THE DRAWING FIGURES

DETAILED DESCRIPTION OF THE PREFERRED EMBODIMENT

Figure 1:
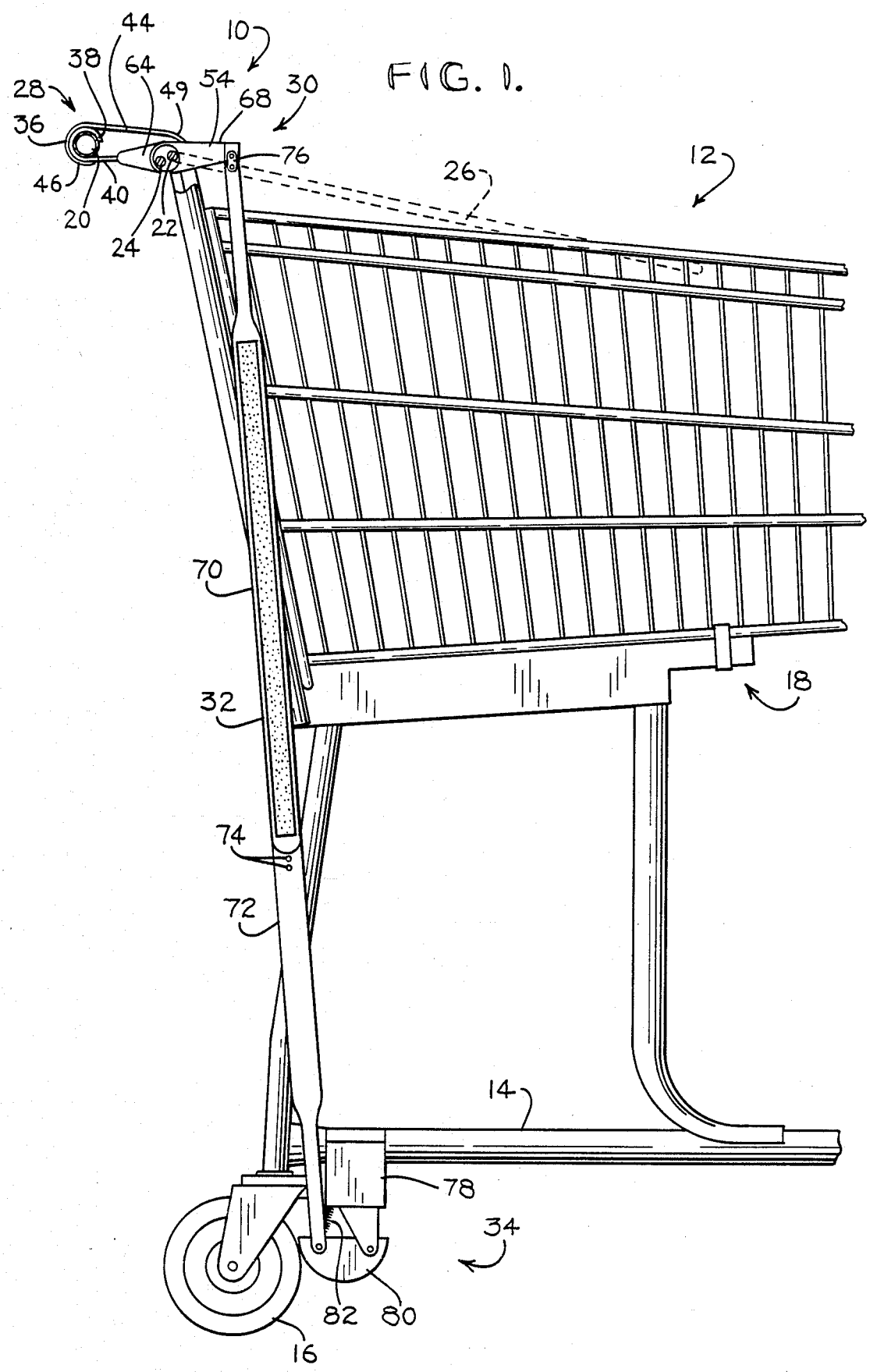
FIG. 1 is a side elevational view in partial section of the braking apparatus hereof showing it connected to a grocery cart shown in partial elevation with portions cut away for clarity.

Preferred automatic braking apparatus 10 is illustrated in the drawing figures and described herein in connection with a conventional grocery cart 12 as the preferred environment of use. Those skilled in the art will appreciate, however, that the teachings of the present invention are applicable to other types of carts, such as luggage carts, as well, and the illustration and description in connection with grocery cart 12 should not be considered limited to the utility of apparatus 10.

FIG. 1 illustrates cart 12 which includes a pair of lower support beams 14 (only one of which is shown), rear support wheel 16 (only one of which is shown), cart body 18, transverse cart handle 20 rearwardly spaced from cart body 18, parallel, adjacent, rearward, upper and lower cross braces 22, 24, and rear nesting panel 26 hingedly coupled with cross brace 22.

Braking apparatus 10 broadly includes operating member 28, left and right intermediate or pivot structures 30, left and right interconnecting straps 32 and left and right braking mechanisms 34. Preferably, apparatus 10 includes identical components for actuating and braking both rear wheels 16 of cart 12, one set of components for the left wheel and the second set for the right wheel 16 shown in FIG. 1. Inasmuch as the components are identical except for the left-right orientation, they are numbered the same herein.

Operating member 28 (FIG. 2) is preferably composed of transparent synthetic resin material and is integrally constructed to include graspable handle portion 36, left and right handle clips 38, extension arm 40, and left and right bosses 42. Handle portion 36 is preferably configured to present safety cover 44 and handle-engagement portion 46.

Cover 44 presents planar portion 48 which extends along the length of cart handle 20 between handle clips 38 and extends over cart handle 20 forwardly over cross braces 22, 24. A cutaway portion 25 is defined in cover 44 to allow access to cart handle 20. The forward edge of planar portion 48 is preferably configured to slope downwardly to present forward shield portion 49 to shield braces 22, 24 from contact therewith by a child occupying the child seat typically provided with cart 12. Portion 49 thereby prevents a child from being injured by braces 22, 24 if cart 12 is bumped or abruptly accelerated.

Handle-engagement portion 46 presents a C-shaped cross-sectional configuration, extends rearwardly from handle portion 36, and extends around the rearward side of cart handle 20. The preferred configuration of handle portion 36 is thus disposed between a user of cart 12 and cart handle 20.

Figure 3:
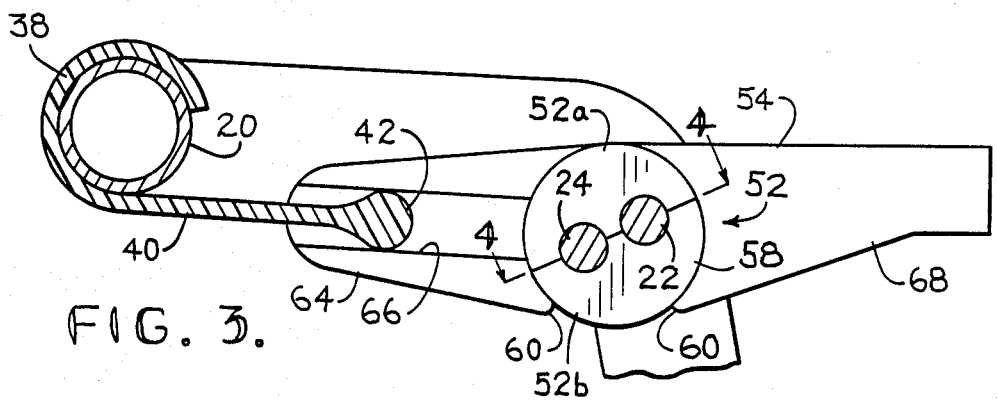
FIG. 3 is partial sectional view taken along line 3—3 of FIG. 2 showing components of the braking apparatus in relation to the cart handle and cross braces.

Handle clips 38 each present a C-shaped cross section as best viewed in FIG. 3 and clip snugly around cart handle 20 for pivotally securing operating member 28 thereto. Clips 38 are spaced apart at opposed sides of member 28. Extension arms 40 extend forwardly from the lower portion of respective handle clips 38 toward cross braces 22, 24 and present cylindrical bosses 42 which extend from the outboard sides of arms 40 adjacent the forward ends thereof parallel to cart handle 20.

Gussets 50 connect the inboard sides of extension arms 40 to the adjacent lower areas of handle engagement portion 46 to reinforce and stiffen extension arms 40.

Figure 4:
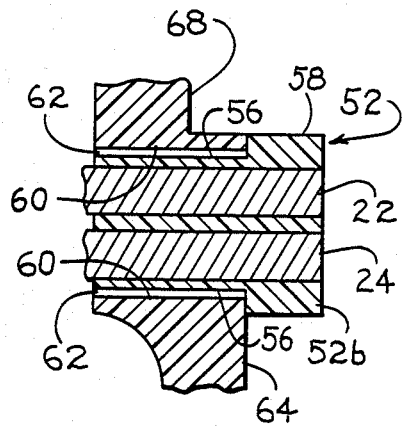
FIG. 4 is a partial sectional view taken along line 4—4 of FIG. 3 illustrating a rotation bushing of the braking apparatus.

Pivot structures 30 each include a split rotation bushing 52 and yoke 54 (FIGS. 3 and 4).

Split bushing 52 includes two respective halves 52a and 52b configured to mate with cross braces 22, 24. The surface of bushing 52 is recessed to present bearing surface 56 having a circular cross-sectional configuration, and to present annular retaining structure 58 on the inboard side thereof. Split halves 52a, b of bushing 52 are held together by yoke 54.

Yoke 54 presents pivot recess 60 having a C-shaped cross-sectional configuration which snaps around bushing 52 thereby holding the halves 52a, b together. The interior surface of pivot recess 60 includes a plurality of spaced apart, transverse, bearing ribs 62 which bear on bearing surface 56. Yoke 54 and bushing 52 are preferably composed of synthetic resin material or nylon for high strength and low friction at the bearing point between bearing ribs 62 and bearing surface 56.

Figure 2:
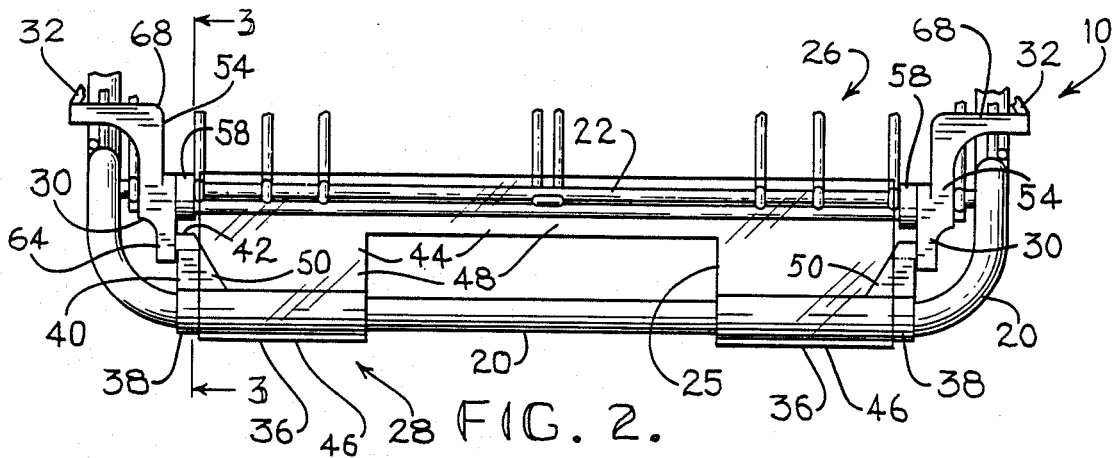
FIG. 2 is a partial plan view of the cart of FIG. 1 showing components of the braking apparatus coupled thereto.

Yoke 54 also includes rearwardly directed extension element 64 presenting longitudinal pivot slot 66 defined on the inboard side thereof which matingly and slidably receives a respective boss 42 therein. Yoke 54 also includes connecting arm 68 presenting a right angle configuration which extends forwardly and outwardly as shown in FIG. 2 with the outboard tip thereof positioned on the outboard side of cart body 18.

Interconnecting strap 32 interconnects the outboard tip of connecting arm 68 with a respective braking mechanism 34. Strap 70 is preferably composed of nylon and includes upper and lower sections 70, 72. Upper section 70 includes an integral pin (not shown) which is selectively received in one of a plurality of longitudinally spaced-apart adjustment holes 74 defined adjacent the upper end of lower section 72. By selecting the appropriate adjustment hole 74, the length of strap 32 can be adjusted as desired. Conventional clip 76 connects the upper end of strap 32 with the outboard tip of connecting arm 68. The lower end of strap 32 is connected to braking mechanism 34 as will be explained further hereinbelow. Advantageously, upper section 70 is provided with a reflective surface as an added safety feature when cart 12 is used at night in a parking lot, for example.

Braking mechanism 34 includes mounting bracket 78, braking body 80, and biasing spring 82.

Mounting bracket 78 is preferably configured as a U-shaped clip attached to lower side frame beam 14 adjacent rear support wheel 16.

Braking body 80 is preferably composed of nylon or synthetic resin material and presents a semi-circular cross sectional configuration. Body 80 is pivotally mounted to mounting bracket 78 adjacent the forward end thereof as shown in FIG. 1 and oriented with the curved surface thereof extending downwardly and so that the rearward surface of braking body 80 engages the forward surface of cart wheel 16.

Biasing spring 82 is disposed in compression between mounting bracket 80 and the rearward top flat surface of body 18 as shown in FIG. 1 in order to yieldably bias body 18 into contact with wheel 16. The lower end of interconnecting strap 32 is pivotally coupled with braking body 80 adjacent the rearward end thereof.

The drawing figures illustrate braking apparatus 10 in the braked position. In this position, biasing spring 82 biases braking body 80 so that the rearward surface thereof engages the forward surface of rear support wheel 16. Spring 82 also biases pivot structure 30, operating member 20, and interconnecting strap 32, into the braked position as well.

Friction contact between braking body 80 and wheel 16 due to the bias of spring 82 provides the needed braking action to prevent cart 12 from coasting on a sloped surface. In the event that cart 12 is fully laden and located on a highly sloped surface, forward motion of cart 12 causes clockwise rotation of wheel 16 as shown in FIG. 1. This in turn results in counterclockwise rotation of braking body 80 which causes the rearward surface of braking body 80 to more tightly engage wheel 16 thereby increasing the braking action.

Even with apparatus 10 in the braked position, a user can pull cart 12 rearwardly, when removing cart 12 from an assembly of nested carts for example, which overcomes the braking friction and allows wheel 16 to rotate in order to remove cart 12 from the nested assembly.

The removal of cart 12 from a nested assembly is facilitated by nesting panel 26, shown in phantom lines in FIG. 1, acting on connecting arm 68. When nested, a rearward cart pushes panel 26 of the next forward cart upwardly which pushes arm 68 upwardly to place braking mechanism 34 in the released position. This also enbles the nested assembly to be moved with the braking action of the rearward cart released by action of the person pushing the nested cart assembly.

To use cart 12, a user grasps handle portion 36 with the fingertips resting on planar portion 48. When the user pushes forwardly, the fingertip force translates into a slight downward force on operating member 28 which causes it to rotate clockwise as shown in FIG. 1 to overcome the bias of spring 82.

When this occurs, extension arm 40 along with boss 42 also move downwardly as best viewed in FIG. 2.

Boss 42 thereby exerts downward force on the lower wall of pivot slot 66 which in turn causes yoke 54 to rotate counterclockwise. During this rotation, boss 42 slides rearwardly along pivot slot 66 away from bushing 52 which increases the leverage exerted by boss 42 on yoke 54 so that the force needed to hold apparatus 10 in the released position is less than that required to initiate the action.

As yoke 54 rotates counterclockwise about bushing 52, the outboard tip of extention element 64 moves upwardly which in turn shifts interconnecting strap 32 upwardly to rotate braking body 80 clockwise. This disengages body 80 from wheel 16 to release the braking action.

As FIG. 1 illustrates, the structure of braking mechanism 34 is such that only slight rotation of braking body 80 is required to disengage it from contact with wheel 16. Thus, only slight rotation of operating member 28 is required to shift pivot structure 30 and braking mechanism 32 from the braked position to the released position. This adds to the convenience and user acceptance of braking apparatus 10 without affecting the effectiveness of the braking action.

When the user releases the grasp on handle portion 36, biasing spring 82 shifts braking body 80 back into contact with wheel 16, and by way of interconnecting strap 32, also shifts pivot structure 30 and operating member 28 back to the braked position.

The structure of braking apparatus 10 also provides a substantial advantage in that it can be retrofitted on existing carts quickly and conveniently by unskilled personnel. For example, braking apparatus 10 can be provided as a kit including basically three components. The first component includes braking mechanism 34 with lower section 72 of strap 32 pivotally connected to braking body 80. The second component includes bushing 52 and yoke 54 with upper section 70 of strap 32 pivotally connected to connecting element 68. The third component includes operating member 28.

To install apparatus 10, mounting bracket 78, in its preferred form as a U-shaped clip, is clipped to beam 14 adjacent wheel 16 so that the rearward surface of braking body 80 engages the forward surface of wheel 16. Advantageously, an additional C-clip can be placed over bracket 78, if desired, to prevent shifting from the desired adjustment.

The two halves 52a and 52b of split bushing 52 are then placed around cross braces 22, 24 at the outboard ends thereof. Pivot recess 60 of yoke 54 is then snapped around bushing 52 to hold it together.

Operating member 28 is then placed on cart handle 20 by first inserting boss 42 in pivot slot 66 and then snapping handle clips 38 around cart handle 20. As the last step, the snap pin of upper section 70 is placed in the appropriate adjustment hole of lower section 72.

Those skilled in the art will appreciate that the present invention encompasses many variations in the specific embodiment herein described. For example, the size, shape, and arrangement of the components may be modified depending upon the structure of the particular type of cart on which apparatus 10 is to be installed. Additionally, apparatus 10 can be incorporated as part of a cart during manufacture which may economically require a different configuration than that described herein for retrofit on an existing cart. Finally, the material composition of the various components can be varied as a matter of design choice.

I claim:

1. An automatic braking apparatus in combination with a user-propelled grocery cart, luggage cart or the like having support wheels and a transverse handle rearwardly spaced from the body of the cart, said braking apparatus comprising:

a braking mechanism for shiftably coupling with the cart and for shifting between braked and released positions, said mechanism including braking means for braking at least one support wheel when in said braked position and for releasing said wheel for unbraked rotation thereof when in said released position, an intermediate structure for shiftably coupling with the cart adjacent the handle thereof and for shifting between braked and released positions, said intermediate structure including means for connecting with said braking mechanism for corresponding shifting of said structure and said mechanism between said braked and released positions;

an operating member for pivotally coupling with the cart handle for pivotal shifting between braked and released positions and for shiftably coupling with said intermediate structure for corresponding shifting of said member and said structure between said braked and released positions, said operating member including a graspable handle portion interposed between the user of the cart and the cart handle for grasping by the user for shifting said operating member and thereby said intermediate structure and braking mechanism from said braked positions to said released positions when the user grasps said handle portion and pushes generally forwardly; and means biasing said braking mechanism, intermediate structure, and operating member toward said braked positions for shifting thereto when the user releases said handle portion for automatic braking of the cart, the cart including two rearward support wheels, said braking means including a pair of braking structures for respectively braking the two rearward support wheels when said mechanism is in said braked position, said intermediate structure including a pair of pivot structures for respectively and pivotally coupling with the cart adjacent opposed ends of the handle, said pivot structures presenting respective, opposed, first and second ends, said connecting means including means respectively connecting said first ends with said respective braking structures, said operating member including means for coupling with said respective second ends of said pivot arms, and said connecting means including a pair of elongated elements respectively connecting said first ends and said braking structures, said elements respectively extending along opposed sides of the cart body, each of said elements including an outwardly facing reflective surface.

2. The apparatus as set forth in claim 1, said biasing means including a spring coupled with said braking mechanism for biasing said mechanism and thereby said intermediate structure and said operating member toward said braking position.

3. The apparatus as set forth in claim 1, the cart including transverse bracing adjacent the rearward portion of the cart body said operating member including shield means for shielding said bracing.

4. An automatic braking apparatus in combination with a user-propelled grocery cart, luggage cart or the like having support wheels and a transverse handle rearwardly spaced from the body of the cart, said braking apparatus comprising:
- a braking mechanism for shiftably coupling with the cart and for shifting between braked and released positions, said mechanism including braking means for braking at least one support wheel when in said braked position and for releasing said wheel for unbraked rotation thereof when in said released position;
- an intermediate structure for shiftably coupling with the cart adjacent the handle thereof and for shifting between braked and released positions, said intermediate structure including means for connecting with said braking mechanism for corresponding shifting of said structure and said mechanism between said braked and released positions;
- an operating member for pivotally coupling with the cart handle for pivotal shifting between braked and released positions and for shiftably coupling with said intermediate structure for corresponding shifting of said member and said structure between said braked and released positions,
- said operating member including a graspable handle portion interposed between the user of the cart and the cart handle for grasping by the user for shifting said operating member and thereby said intermediate structure and braking mechanism from said braked positions to said released positions when the user grasps said handle portion and pushes generally forwardly; and
- said connecting means including an elongated element interconnecting said intermediate structure and said braking mechanism, said element extending along one side of the cart body and including an outwardly facing reflective surface.

5. The apparatus as set forth in claim 4, said biasing means including a spring coupled with said braking mechanism for biasing said mechanism and thereby said intermediate structure and said operating member toward said braked position.

6. The apparatus as set forth in claim 4, the cart including transverse bracing adjacent the rearward portion of the cart body, said operating member including shield means for preventing contact with the bracing by a person riding in the cart.

7. An automatic braking apparatus in combination with a user-propelled grocery cart, luggage cart or the like having support wheels and a transverse handle rearwardly spaced from the body of the cart, said braking apparatus comprising:
- a braking mechanism for shiftably coupling with the cart and for shifting between braked and released positions, said mechanism including braking means for braking at least one support wheel when in said braked position and for releasing said wheel for unbraked rotation thereof when in said released position;
- an intermediate structure for shiftably coupling with the cart adjacent the handle thereof and for shifting between braked and released positions, said intermediate structure including means for connecting with said braking mechanism for corresponding shifting of said structure and said mechanism between said braked and released positions;
- an operating member for pivotally coupling with the cart handle for pivotal shifting between braked and released positions and including means for shiftably coupling with said intermediate structure for corresponding shifting of said member and said structure between said braked and released positions,
- said operating member including a graspable handle portion interposed between the user of the cart and the cart handle for grasping by the user for shifting said operating member and thereby said intermediate structure and braking mechanism from said braked positions to said released positions when the user grasps said handle portion and pushes generally forwardly; and
- said coupling means of said operating member including a forwardly extending extension arm presenting an outwardly extending boss, said intermediate structure including a rearwardly extending extension element having an elongated boss-receiving slot defined therein, said boss being received in said slot for coupling said member with said intermediate structure.

8. The apparatus as set forth in claim 7, said biasing means including a spring coupled with said braking mechanism for biasing said mechanism and thereby said intermediate structure and said operating member toward said braked position.

9. The apparatus as set forth in claim 7, the cart including transverse bracing adjacent the rearward portion of the cart body, said operating member including shield means for preventing contact with the bracing by a person riding in the cart.

10. An automatic braking apparatus in combination with a user-propelled grocery cart, luggage cart or the like having support wheels and a transverse handle rearwardly spaced from the body of the cart, said braking apparatus comprising:
- a braking mechanism for shiftably coupling with the cart and for shifting between braked and released positions, said mechanism including braking means for braking at least one support wheel when in said braked position and for releasing said wheel for unbraked rotation thereof when in said released position;
- pivot structure for pivotally coupled with the cart about a fixed pivot point adjacent one end of the cart handle for pivotal shifting between braked and released positions, said pivot structure presenting first and second, opposed, connection portions;
- connecting means connecting said first connection portion with said braking means for mutual, corresponding, shifting of said pivot structure and braking means between said braked and released positions; and
- handle means for pivotally coupling with the cart handle for pivotal shifting between braked and released positions and including means for coupling with said second connection portion for mutual, corresponding, shifting of said handle means and pivot structure, and thereby said braking means, between said braked and released positions,
- said handle means and pivot structure being shiftable in opposed rotational directions during mutual corresponding shifting between said braked and released positions.

11. The apparatus as set forth in claim 10, said means for coupling with said second portion including a forwardly extending extension arm presenting an outwardly extending boss, said second connection end of said pivot structure including a rearwardly extending extension element having an elongated slot defined therein for receiving said boss for coupling said handle means with said pivot structure.

* * * * *